US011114838B2

(12) United States Patent
Li

(10) Patent No.: US 11,114,838 B2
(45) Date of Patent: Sep. 7, 2021

(54) IDEAL DIODE WITH ACTIVE REVERSE VOLTAGE PROTECTION

(71) Applicant: ABB Schweiz AG, Baden (CH)

(72) Inventor: Haoran Li, Minden (DE)

(73) Assignee: ABB SCHWEIZ AG, Baden (CH)

( * ) Notice: Subject to any disclaimer, the term of this patent is extended or adjusted under 35 U.S.C. 154(b) by 212 days.

(21) Appl. No.: 16/249,962

(22) Filed: Jan. 17, 2019

(65) Prior Publication Data

US 2019/0148931 A1 May 16, 2019

Related U.S. Application Data

(63) Continuation of application No. PCT/EP2017/068284, filed on Jul. 19, 2017.

(30) Foreign Application Priority Data

Jul. 19, 2016 (EP) .................................. 16180113

(51) Int. Cl.
*H02H 3/18* (2006.01)
*H02J 7/00* (2006.01)
*H02H 1/00* (2006.01)
*H02J 9/06* (2006.01)

(52) U.S. Cl.
CPC ............ *H02H 3/18* (2013.01); *H02H 1/0007* (2013.01); *H02J 7/0034* (2013.01); *H02J 9/061* (2013.01)

(58) Field of Classification Search
CPC ........ H02H 3/18; H02H 1/0007; H02J 7/0034
See application file for complete search history.

(56) References Cited

U.S. PATENT DOCUMENTS

| 4,438,473 A * | 3/1984 | Cawley .................. G05F 1/569 361/101 |
| 5,726,505 A | 3/1998 | Yamada |
| 7,408,134 B1 * | 8/2008 | Shaw ...................... G01D 1/18 219/501 |
| 7,477,502 B1 | 1/2009 | Faulkner et al. |
| 2007/0188198 A1 * | 8/2007 | Bird ........................ G06F 1/263 327/63 |
| 2011/0138906 A1 * | 6/2011 | Schastok ............ G01F 23/0069 73/304 R |
| 2013/0162029 A1 | 6/2013 | Reichow et al. |

FOREIGN PATENT DOCUMENTS

| CN | 102792541 A | 11/2012 |
| CN | 203850812 U | 9/2014 |
| CN | 105244864 A | 1/2016 |
| WO | WO 2010047711 A1 | 4/2010 |

* cited by examiner

*Primary Examiner* — Scott Bauer
(74) *Attorney, Agent, or Firm* — Leydig, Voit & Mayer, Ltd.

(57) ABSTRACT

A reverse current inhibitor includes: at least one diode that is bridged by a first variable resistance element; a sensing circuit; a first switching device for switching the first variable resistance element from a first higher resistance to a second lower resistance in response to a forward current that has passed the diode in its forward direction; and a second switching device for switching the first variable resistance element to a higher resistance in response to the sensing circuit detecting a reverse current corresponding to the reverse direction of the diode. The sensing circuit includes a current-voltage converter that includes a sensing resistor and amplifies a voltage drop over the sensing resistor for one sign of the voltage drop only.

16 Claims, 3 Drawing Sheets

IDEAL DIODE WITH ACTIVE REVERSE VOLTAGE PROTECTION

CROSS-REFERENCE TO PRIOR APPLICATION

This application is a continuation of International Patent Application No. PCT/EP2017/068284, filed on Jul. 19, 2017, which claims priority to European Patent Application No. EP 16180113.9, filed on Jul. 19, 2016. The entire disclosure of both applications is hereby incorporated by reference herein.

FIELD

The invention pertains to a reverse current inhibitor that mimics the function of an ideal diode, i.e., a negligible voltage drop in the forward direction in combination with a negligible reverse current.

BACKGROUND

In systems having multiple redundant power sources, a need arises to prevent one power source from feeding power back into the other power source in the reverse direction, since such a reverse current might damage this other power source. The most common instrument to inhibit such a reverse current is a diode.

The main drawback of a conventional diode is that a small voltage drop is inevitably present across the diode even when the diode is operated in the forward direction where it is supposed to let the current pass. The forward current therefore causes a power dissipation. In high-power applications, currents of several hundred amps may flow through a single diode, resulting in dissipation of several hundred watts. This requires a substantial heat sink. In addition, since degradation of semiconductor components is accelerated exponentially with temperature, such power dissipation may be detrimental to the service life of the diode.

Therefore, "ideal diode" circuits that eliminate the voltage drop in the forward direction are well-known in the art. In such a circuit, the actual diode is bridged by a variable resistance element. A forward current initially flows through the diode and then switches the variable resistance element (e.g., a field-effect transistor) from a high resistance (i.e., next to open circuit) to a negligible resistance. From then on, the complete forward current flows through the variable resistance element with next to no voltage drop, rather than through the diode. This eliminates the power dissipation. The drawback of such circuits is that once the variable resistance element is in the negligible resistance state, there is no more way to prevent a subsequently occurring reverse current from traversing the circuit.

Therefore, WO 2010/047 711 A1 discloses an improved "ideal diode" circuit that constantly monitors the direction of the current and switches the variable resistance element back to high resistance in case a reverse current occurs. In this manner, the elimination of the undesirable voltage drop is combined with continuous protection against potentially damaging reverse currents.

SUMMARY

In an embodiment, the present invention provides a reverse current inhibitor, comprising: at least one diode that is bridged by a first variable resistance element; a sensing circuit; a first switching device configured to switch the first variable resistance element from a first higher resistance to a second lower resistance in response to a forward current that has passed the diode in its forward direction; and a second switching device configured to switch the first variable resistance element to a higher resistance in response to the sensing circuit detecting a reverse current corresponding to the reverse direction of the diode, wherein the sensing circuit comprises a current-voltage converter that includes a sensing resistor and is configured to amplify a voltage drop over the sensing resistor for one sign of the voltage drop only.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
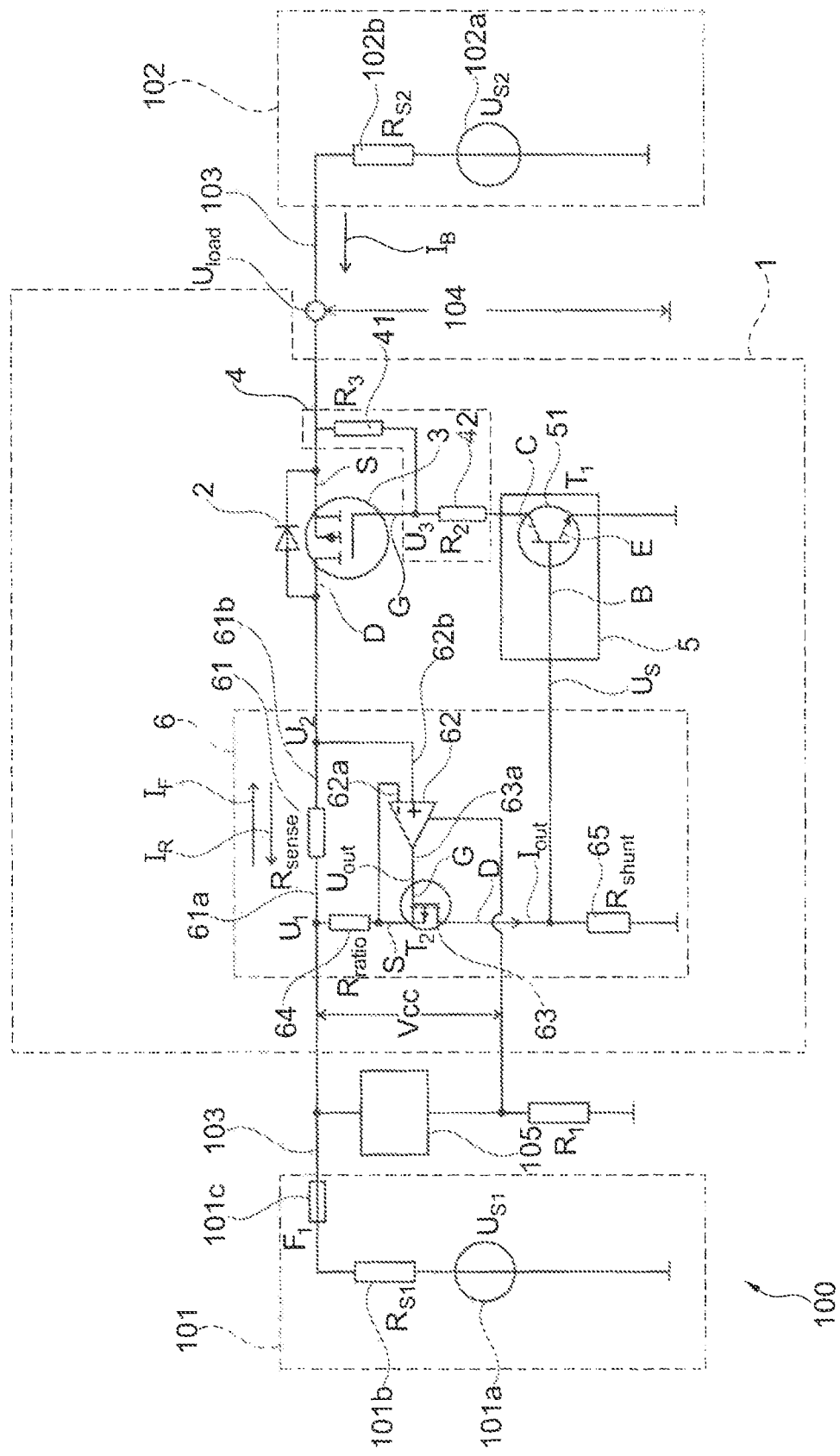
FIG. 1: Power supply circuit 100 with two power supplies 101, 102 and reverse current inhibitor 1 according to an embodiment of the invention.

It is the objective of the present invention to provide a simpler "ideal diode" circuit with a potentially faster reaction time in case of a reverse current.

This objective is achieved by a reverse current inhibitor according to the main claim. Further independent claims are directed to the two main use cases of the reverse current inhibitor. Further advantageous embodiments of the invention are detailed in the dependent claims.

The inventors have developed a reverse current inhibitor. This inhibitor comprises at least one diode that is bridged by a first variable resistance element and a first switching device for switching the first variable resistance element from a first higher resistance to a second lower resistance in response to a forward current $I_F$ that has passed the diode in its forward direction. A second switching device is provided to switch the first variable resistance element to a higher resistance in response to a sensing circuit detecting a reverse current IR corresponding to the reverse direction of the diode.

According to the invention, the sensing circuit comprises a current-voltage converter that includes a sensing resistor and amplifies a voltage drop $U_{sense}$ over the sensing resistor for one sign of said voltage drop only. For example, the voltage drop $U_{sense}$ may be amplified when the current through the sensing resistor is a forward current $I_F$, while the current-voltage converter may output a zero voltage when the current through the sensing resistor is a reverse current $I_R$.

The inventors have found that said amplification can be effected with simple and inexpensive analog components, and therefore almost instantaneously. If the output voltage is then used as a signal to control the resistance of the first variable resistance element, said amplification results in a very fast reaction time. This is very important for the circuit to afford an effective protection against equipment damage, since many faults result in undesired currents that escalate exponentially with time.

In a specially advantageous embodiment of the invention, the voltage drop $U_{sense}$ is first amplified into an output voltage $U_{out}$ and the output voltage $U_{out}$ is subsequently converted into an output current $I_{out}$. This conversion may optionally include a further stage of amplification, so as to further increase the slew rate of the output signal $I_{out}$ in response to a reverse current $I_R$ occurring, and further speed up the final reaction of switching the first variable resistance element back to high resistance. The additional conversion into an output current may also implement the decision, based on the direction of the current (i.e., forward current $I_F$ or reverse current $I_R$) through the sensing resistor, whether to output an amplified output current $I_{out}$, or whether to output a constant or zero output current $I_{out}$. For example, the sign of the output voltage $U_{out}$ may depend on the direction of the current, and the conversion into the output current $I_{out}$ may be configured to depend on this sign.

Specifically, when the current through the sense resistor ceases to be a forward current $I_F$ and becomes a reverse current $I_R$ instead, the behaviour of the current-voltage converter may change discontinuously in response to the voltage drop $U_{sense}$ changing sign. Compared with the cited prior art, it is not necessary for the reverse current $I_R$ to exceed a certain threshold before action is taken and the reverse current is blocked by the first variable resistance element. Rapid disconnection of exponentially escalating fault currents is paramount for the protection of equipment.

A sensing circuit that outputs an output current $I_{out}$ is a current mirror, i.e., the current through the sensing resistor is scaled and copied to the output current $I_{out}$. This output current $I_{out}$ is typically a lot lower than the intended forward load current $I_F$, so it may appear contradictory at first sight that we are talking about "amplification". The solution to this conundrum is that the voltage drop $U_{sense}$ in the forward direction is exactly the quantity that an "ideal diode" circuit is meant to minimize in the first place, to minimize the undesired power dissipation. To this end, the resistance value of the sense resistor may be extremely low. It may be, for example, 1 ohm or less, preferably 500 milliohms or less and most preferably 200 milliohms or less. For the provision of such a low resistance value, it may not even be necessary to implement the sense resistor as a separate discrete component. For example, the ohmic resistance of a stretch of a line that supplies the forward current $I_F$ to an electrical load may serves as the sensing resistor. It is thus one of the basic ideas of the invention to make the measurement signal $U_{sense}$ very small initially to avoid the undesired power dissipation, and then employ amplification of this very small signal to obtain a fast reaction to the occurrence of a reverse current $I_R$. $I_{out}$ is much smaller than $I_F$ so as not to divert the main flow of power from its path through the intended electrical load, but without the amplification, $I_{out}$ would be even smaller.

In a further specially advantageous embodiment of the invention, the current-voltage converter comprises an operational amplifier with a negative input and a positive input. The negative input is coupled to one side of the sensing resistor, while and the positive input is coupled to the other side of the sensing resistor. One or both of these couplings may optionally include further fixed resistances. The operational amplifier unites the functions of comparator and amplifier, and it is very fast because its inputs are high-ohmic, low-capacitance.

In a further specially advantageous embodiment of the invention, the output voltage $U_{out}$ of the operational amplifier controls a second variable resistance element, so as to convert the output voltage $U_{out}$ into an output current $I_{out}$.

This is a fast and efficient way to achieve a sign-dependent amplification of voltage $U_{out}$ to current $I_{out}$.

The ratio K between the output current $I_{out}$ on the one hand and the forward current $I_F$ or reverse current $I_R$ on the other hand, wherein $I_F$ or $I_R$ has given rise to the voltage drop $U_{sense}$ across the sensing resistor in the first place, may preferably be set using a fixed resistor that is provided in the current path through the second variable resistance element. This ratio K may, for example, be 1/100 or less, preferably 1/500 or less and most preferably 1/1000 or less. In this manner, the sensing circuit does not introduce a significant power dissipation even in high-power applications.

Preferably, the second variable resistance element is a field-effect transistor and the output voltage $U_{out}$ is applied to the gate of this field-effect transistor. The output current $I_{out}$ will then almost instantaneously react when the forward current $I_F$ through the sense resistor reverses direction to become a reverse current $I_R$, causing the voltage drop $U_{sense}$ to change sign. The field-effect transistor itself may have a nonzero switching threshold, but since $U_{out}$ changes sign as abruptly as $U_{sense}$, $I_{out}$ may be switched off without delay when a reverse current $I_R$ occurs.

In a further specially advantageous embodiment of the invention, the output current $I_{out}$ is passed through a shunt resistor, and the voltage drop $U_S$ across the shunt resistor serves as a control voltage for the first switching device to switch the first variable resistance element to a higher resistance. If the first switching device is controlled by a voltage, rather than by a current, switching time is generally faster. The resistance value of the shunt resistor may be used as an additional degree of freedom to fine-tune the voltage drop $U_S$ to the needs of the concrete control means.

These control means may preferably comprise a transistor that controls a current through a voltage divider, wherein said voltage divider serves as means to switch the first variable resistance element to the lower resistance. At startup, when there is a small initial forward current $I_F$, the current-voltage converter may amplify the small voltage drop $U_{sense}$ across the sensing resistor into an output voltage $U_{out}$, an output current $I_{out}$, and finally a control voltage $U_S$ that switches the transistor on. This may, for example, connect one end of the voltage divider to a ground potential. The initial current $I_F$ may flow across the diode and partly through said voltage divider and the transistor, so a voltage may be generated by the voltage divider that switches the first variable resistance element to negligible resistance. If the transistor is turned off, there is no current across the voltage divider, and consequently, the voltage divider does not create any voltage.

With respect to this arrangement, it is important that there be an amplification of the voltage drop $U_{sense}$ across the sensing resistor because the initial voltage drop $U_{sense}$ is very small. The amplification in the current-voltage converter (current mirror) ensures that even this small initial voltage drop can be detected and converted into a final signal that switches the first variable resistance element to its negligible resistance state. At the same time, it is ensured that this switching state is maintained when, subsequently, the forward current $I_F$ increases many times. Said amplification is therefore able to convert a very large dynamic range of the voltage drop $U_{sense}$ to a negligible resistance state of the first variable resistance element, while switching this variable resistance element immediately back to high resistance (i.e., next to open circuit) when $U_{sense}$ changes sign. The current-voltage converter is configured to amplify the voltage drop $U_{sense}$ only if the current through the sensing resistor is a forward current $I_F$ in the forward direction.

The first variable resistance element may especially be a field-effect transistor, such as a power MOSFET. Such a transistor can switch a high load current and already contains a body diode that may serve as the diode that is bridged by the field-effect transistor.

The main use case for the reverse current inhibitor is a power supply circuit where a first power supply and a second power supply feed power into a bus to power one or more electrical loads. Both power supplies are separated from one another on the bus by means of a current inhibitor provided by the present invention.

For example, the first power supply may be a switching power supply, and the second power supply may be a backup battery. During normal operation, the switching power supply may provide a voltage that is slightly higher than the voltage of the backup battery, so that the backup battery is continuously kept trickle-charged. When the switching power supply loses mains power, it will no longer provide a voltage, so if the "ideal diode" remained in its negligible forward resistance state, a reverse current $I_R$ could flow from the backup battery into the switching power supply. A backup battery is an especially prodigious producer of high currents, and since the internal resistance of a switching power supply for a high-power application will be low, the backup battery may be almost shorted through the switching power supply. If the reverse current $I_R$ were not to be interrupted, the electronics in the switching power supply might be damaged.

Especially in a use case like this where the reverse current $I_R$ may very quickly rise to high levels, it is important that this reverse current $I_R$ be interrupted as soon as possible. Otherwise, the current $I_R$ may soon exceed the maximum current that can be severed by switching the first variable resistance element to its high resistance state.

In a specially advantageous embodiment of the invention, the power supply circuit further comprises a voltage regulator for powering the amplification in the current-voltage converter. The voltage regulator is powered by the first power supply. In this manner, the amplification is protected against variations of the supply voltage from the first power supply and works as long as the first power supply is operational. If the first power supply fails, the amplification loses its supply voltage and cannot output a current $I_{out}$ any more. This will cause the voltage drop across the shunt resistor to drop to zero as well, so the first variable resistance element will be immediately switched to high resistance.

The second main use case of the present invention is an electrical device with internal circuitry that is to be used in areas with a potentially explosive atmosphere. To avoid ignition of this atmosphere, it is a basic requirement that the temperature must remain below some threshold value everywhere in the internal circuitry of the device. This is usually difficult to guarantee if the device has an interconnection port for connection to outside voltages or currents, since the device is at the mercy of those outside voltages and currents. According to the invention, the provided reverse current inhibitor is wired into the current path between the internal circuitry and the interconnection port.

In this manner, when a reverse current $I_R$ begins to flow in a direction that was not planned for, this current $I_R$ may be interrupted immediately by said inhibitor before any point inside the internal circuitry may heat up to a dangerous temperature. Reverse currents $I_R$ are more dangerous than forward currents $I_F$ in this respect exactly because they are not planned for. The unplanned paths that the reverse currents $I_R$ follow may be of particularly low resistance, and if components of the internal circuitry are destroyed by reverse currents, this usually involves thermal destruction.

FIG. 1 shows an exemplary power supply circuit 100 according to an embodiment of the present invention. An electrical load 104 is powered by two redundant power supplies 101 and 102 connected together and to the load 104 by means of a bus 103. The first power supply 101 is a switching power supply and comprises the actual voltage source 101a that supplies the voltage $U_{S1}$, an internal resistance 101b with value $R_{S1}$ and a fuse 101c that disconnects the power supply 101 when it is overloaded. The second power supply 102 is another switching power supply. It comprises the actual voltage source 102a that supplies the voltage $U_{S2}$ and an internal resistance 102b with value $R_{S2}$. The resulting voltage that is applied to the load 104 is labelled $U_{out}$.

In normal operation, the load 104 is meant to be supplied by the first power supply 101 by means of a forward current $I_F$. If the first power supply 101 fails, the second power supply 102 is supposed to take over and supply the load 104 by means of a backup current $I_B$. To prevent this backup current $I_B$ from flowing back into the first power supply 101 as a reverse current $I_R$, the reverse current inhibitor 1 is provided.

At the heart of the reverse current inhibitor 1, there is a diode 2 that is bridged by the drain-source path of the power MOSFET 3. When the circuit 100 is initially started up, the MOSFET 3 is nonconducting, so a forward current $I_F$ flows across the diode 2. Part of this forward current $I_F$ flows to ground via the voltage divider that comprises the two resistors 41 and 42 with values $R_3$ and $R_2$. This voltage divider 41, 42 creates a voltage $U_3$ that is different from the voltage at the source terminal S of the power MOSFET 3. The voltage $U_3$ is supplied to the gate terminal G of the power MOSFET 3. When the voltage difference between gate G and source S exceeds a certain threshold value, power MOSFET 3 becomes conducting. From then on, the forward current $I_F$ will flow across the MOSFET 3, rather than through the diode 2. The voltage divider 41, 42 therefore provides a first switching device 4 to switch power MOSFET 3 to its conductive state.

For this to work, the path between collector C and emitter E of transistor 51 needs to be conductive. It depends on the current between base B and emitter E of transistor 51, and hence on the voltage $U_S$ at the base B, whether the path between collector C and emitter E is conductive. If this is the case and $U_S$ is later taken away, the connection between collector C and emitter E of transistor 51 will be nonconductive again. $U_3$ in the middle of the voltage divider 41, 42 will climb back to the voltage at the source terminal of power MOSFET 3, so the gate-source voltage will immediately drop below the voltage needed to keep power MOSFET 3 conductive. As a result, the drain-source path of MOSFET 3 will become open circuit again.

The voltage $U_S$ is controlled by sensing circuit 6. At the heart of this sensing circuit 6, a sensing resistor 61 with value $R_{sense}$ converts the current $I_F$, $I_R$ on the bus 103 into a voltage drop $U_{sense}=U_2-U_1$. As will now be detailed, the sensing circuit 6 amplifies the voltage drop $U_{sense}$ if the sign of $U_{sense}$ is positive, and outputs zero voltage and zero current if the sign of $U_{sense}$ is negative.

The first (left-hand) side 61a of the sensing resistor 61 is connected to the negative terminal 62a of the operational amplifier 62 via resistor 64. The second (right-hand) side 61b of the sensing resistor 61 is connected to the positive terminal 62b of operational amplifier 62. $U_{sense}$ is linearly amplified and fed into gate 63a of MOSFET 63, which is used to create the output current $I_{out}$. If $U_{sense}$ is positive, MOSFET 63 will become conductive and enable a flow of output current $I_{out}$. If $U_{sense}$ is negative, MOSFET 63 will remain nonconductive because its source terminal S is fixed to the potential of the bus 103 through resistor 64.

The ratio K of the output current $I_{out}$ is determined by the values of the resistors 64 ($R_{ratio}$) and 61 ($R_{sense}$). Normally, K is less than 1, i.e., the load current is to flow through the sense resistor 61, while only a small current flows through the sensing circuit 6. In the example shown in FIG. 1, $R_{sense}$ is on the order of 100 milliohms.

The output current $I_{out}$ is passed to ground over a shunt resistor 65 with value $R_{shunt}$. The resulting voltage drop across the shunt resistor 65 is the voltage $U_S$ that is passed to the base of transistor 51. If $U_S$ is sufficient to open transistor 51, and the voltage divider 41, 42 produces a voltage $U_3$ that is sufficiently different from the source voltage of the power MOSFET 3, then power MOSFET 3 is made conductive. As long as power MOSFET 3 is nonconductive, a forward current $I_F$ may pass diode 2, while a reverse current $I_R$ is blocked by diode 2.

By tuning the amplification factors in sensing circuit 6, and/or the values of the voltage divider resistors 41, 42, the tipping point of the voltage drop $U_{sense}$ where transistor 51 and power MOSFET 3 are made conductive may be adjusted. A value of $U_S$ on the order of a few volts is sufficient to make transistor 51, and hence power MOSFET 3, conductive. The sensing circuit 6 may multiply the minimal voltage drop $U_{sense}$ by a factor of about 1000 to arrive at $U_S$, so a voltage drop $U_{sense}$ on the order of a few millivolts is sufficient.

The supply voltage $V_{CC}$ for the operational amplifier 62 is provided by the voltage regulator 105 that is powered by the first power supply 101.

Figure 2:
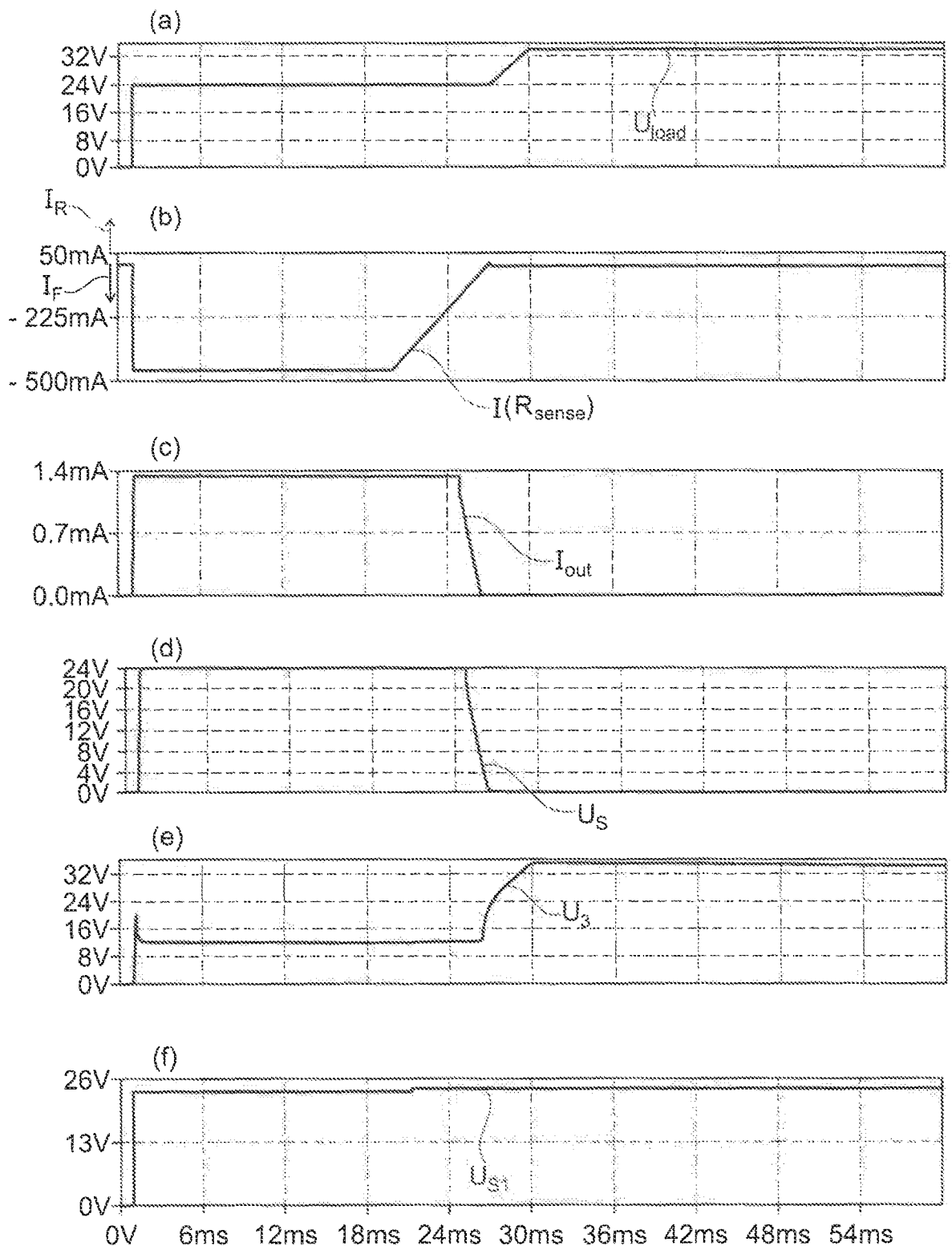
FIG. 2: Reaction of the circuit 100 to application of an overvoltage.

FIG. 2 shows how the circuit of FIG. 1 reacts to a fault that gives rise to an overvoltage at the second power supply 102. The scenario examined in FIG. 2 is that shortly after the first power supply 101 has been switched on to supply 24 V, at about 20 ms, the faulty power supply 102 is switched on and supplies 35 V. The time scale of diagram (f) is valid for all diagrams (a) to (f).

Diagram (a) shows the resulting voltage $U_{load}$ that is applied to the load 104. The increase of $U_{load}$ appears not to be correlated with the onset of the overvoltage at about 20 ms. Rather, a comparison with diagram (e) that shows the voltage $U_3$ applied to the gate G of power MOSFET 3 reveals that the increase of $U_{load}$ is correlated with the severing of the conductive drain-source path through power MOSFET 3.

Diagram (b) shows the current $I(R_{sense})$ passing through sense resistor 61 with resistance value $R_{sense}$. The onset of the overvoltage at about 20 ms immediately decreases the forward current $I_F$. The current reaches nearly zero at about the time when $U_3$ starts to climb (see diagram (e)) and the conductive path for a reverse current $I_R$ is severed.

Diagram (c) shows how the sensing circuit 6 reacts to the onset of the overvoltage. The sensing circuit 6 is biased so that the output current $I_{out}$ already starts to plummet to zero shortly before the current $I(R_{sense})$ changes sign. Consequently, the voltage drop $U_S$ across the shunt resistor 65 plummets to zero as well with no noticeable time lag (diagram (d)).

The loss of the voltage $U_S$ on the basis of the transistor 51 causes collector-emitter path of the transistor 51 to become nonconductive. Consequently, $U_3$ begins to rise to the level of $U_{load}$, namely to 35 V. This causes the drain-source path of power MOSFET 3 to become non-conductive. A reverse current $I_R$ can therefore pass neither through the diode 2 nor through the power MOSFET 3, so it is effectively cut off from the first power supply 101 that the reverse current inhibitor 1 is designed to protect.

Diagram (f) shows the resulting voltage $U_{S1}$ inside the first power supply 101. The voltage climbs from zero to the nominal 24 V when the first power supply 101 is switched on. The application of the overvoltage by the second power supply 102 produces no noticeable increase in the voltage $U_{S1}$. The internal circuitry of the first power supply 101 is therefore effectively protected from the overvoltage.

Figure 3:
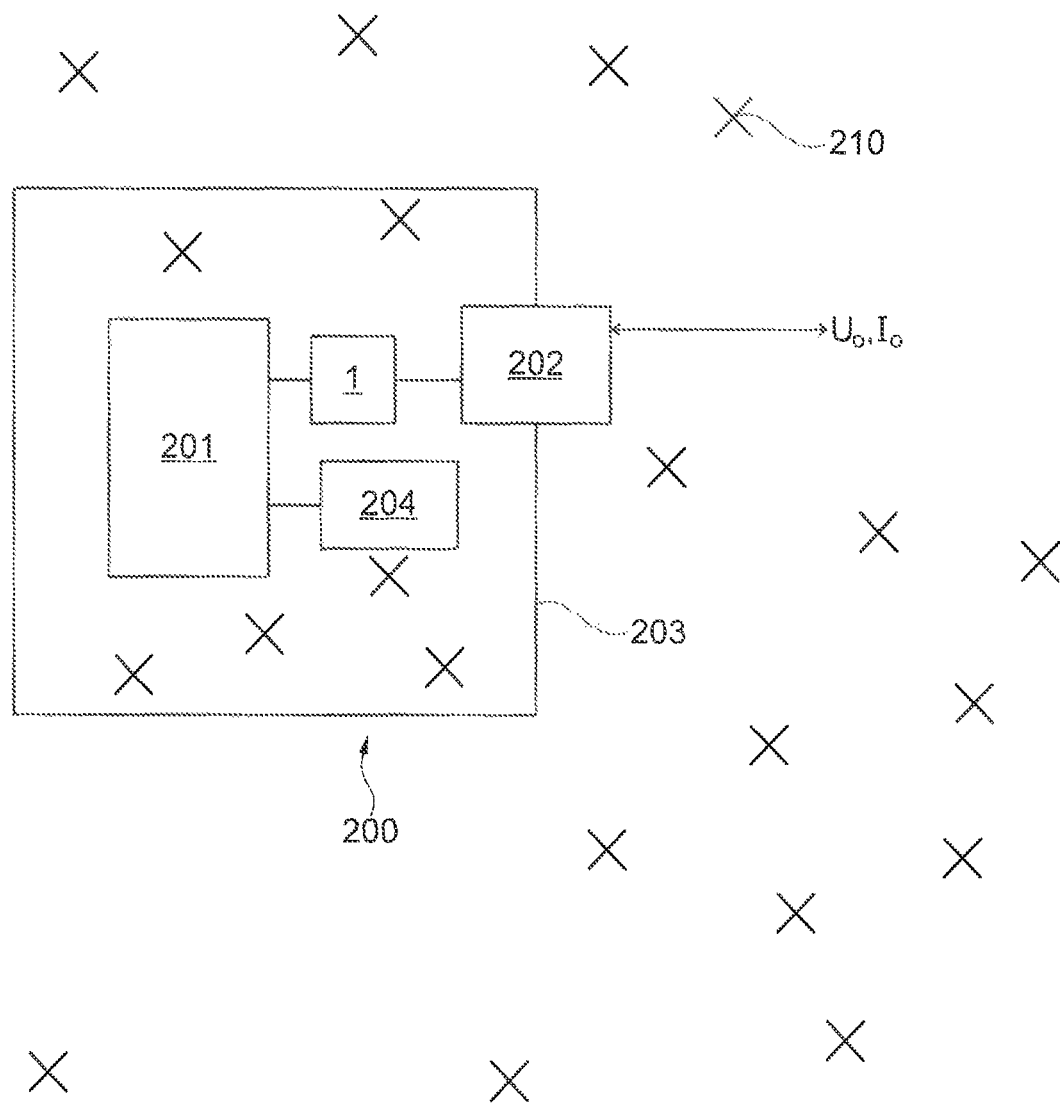
FIG. 3: Device 200 for use in potentially explosive atmosphere 210 as second main use case.

FIG. 3 illustrates the second main use case. An electrical device 200 is designed to interact with outside voltages $U_O$, and/or outside currents $I_O$, to perform whatever primary function, e.g., a measurement or an application of power. The primary function is performed by internal circuitry 201, and the device 200 is connected to the outside voltages $U_O$, and/or currents $I_O$, by means of interconnection port 202.

The device 200 is designed to be used in a potentially explosive atmosphere 210, symbolized by crosses. Because the housing 203 of the device 200 is not hermetically sealed, the interior of the housing is in fluid communication with the potentially explosive atmosphere 210. If the local temperature exceeds the ignition temperature of the atmosphere 210 anywhere in the internal circuitry 201, a detonation may start inside the housing 203. The device 200 may explode in the user's hand, and then the detonation may spread on to the rest of the atmosphere 210. To keep the temperature of the circuitry 201 below the ignition temperature everywhere and at all times, the reverse current inhibitor provided by the present invention is wired into the current path between the internal circuitry 201 and the interconnection port 202. The rationale behind this is that while the device 200 itself may be designed so that it contains only low-current energy sources, such as a battery 204, and it can be verified in advance that the maximum short-circuit current of the battery 204 will not be able to raise the temperature of the circuitry 201 above the ignition temperature, such verification is not possible for outside voltages $U_O$ and outside currents $I_O$ that may come from much higher-powered energy sources. The reverse current inhibitor closes this gap in the protection.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 reverse current inhibitor
2 diode
3 first variable resistance element
4 first switching device to switch first variable resistance element to low resistance
5 second switching device to switch first variable resistance element to high resistance
41, 42 resistors for voltage divider, form part of first switching device 4
51 transistor, forms part of second switching device 5
6 sensing circuit
61 sensing resistor
61a, 61b sides of sensing resistor 61
62 operational amplifier
62a negative input of operational amplifier 62
62b positive input of operational amplifier 62
63 second variable resistance element, converts $U_{out}$ to $I_{out}$
63a gate of second variable resistance element 63
64 fixed resistor in current path through variable resistance element 63
shunt resistor, converts $I_{out}$ to $U_S$
100 power supply circuit
101 first power supply
101a voltage source in first power supply
101b internal resistance of first power supply
101c fuse in first power supply
102 second power supply
102a voltage source in second power supply
102b internal resistance of second power supply
103 electrical bus
104 electrical load
105 voltage regulator for amplifier 62
200 electrical device
201 internal circuitry in device 200
202 interconnection port of device 200
203 housing of device 200
204 battery in device 200
210 explosive atmosphere
$I_B$ backup current
$I_F$ forward current
$I_R$ reverse current
$I_O$ outside currents interacting with device 200
$I(R_{sense})$ current across sensing resistor 61
$I_{out}$ output current converted from $U_{out}$
K ratio between $I_{out}$ and $I_F$ or $I_R$
$U_1$ voltage on side 61a of sensing resistor 61
$U_2$ voltage on side 61b of sensing resistor 61
$U_3$ voltage in middle of voltage divider 41, 42
$U_{load}$ resulting voltage applied to load 104
$U_{sense}$ voltage drop across sensing resistor 61
$U_{out}$ voltage amplified from $U_{sense}$
$U_O$ outside voltages interacting with device 200
$U_S$ voltage drop across shunt resistor 65
$U_{S1}$ voltage of voltage source 101a
$U_{S2}$ voltage of voltage source 102a
$V_{CC}$ supply voltage for amplifier 62

What is claimed is:

1. A reverse current inhibitor, comprising:
   at least one diode that is bridged by a first variable resistance element;
   a sensing circuit;
   a first switching device configured to switch the first variable resistance element from a first higher resistance to a second lower resistance in response to a forward current that has passed the diode in its forward direction; and
   a second switching device configured to switch the first variable resistance element to a higher resistance in response to the sensing circuit detecting a reverse current corresponding to the reverse direction of the diode,
   wherein the sensing circuit comprises a current-voltage converter that includes a sensing resistor and is configured to amplify a voltage drop over the sensing resistor for one sign of the voltage drop only,
   wherein the sensing circuit is configured to amplify the voltage drop if the sign is positive, and to output zero voltage and zero current if the sign is negative,
   wherein the voltage drop is first amplified into an output voltage and the output voltage is subsequently converted into an output current,
   wherein the current-voltage converter comprises an operational amplifier with a negative input and a positive input, the negative input being coupled to one side of the sensing resistor and the positive input being coupled to an other side of the sensing resistor, and
   wherein the output voltage of the operational amplifier is configured to control a second variable resistance element, so as to convert the output voltage into the output current.

2. The reverse current inhibitor according to claim 1, further comprising a fixed resistor in a current path through the second variable resistance element, the fixed resistor being configured to set a ratio between the output current and the forward current or reverse current.

3. The reverse current inhibitor according to claim 2, wherein the ratio is 1/100 or less.

4. The reverse current inhibitor according to claim 1, wherein the second variable resistance element comprises a field-effect transistor and the output voltage is applied to its gate.

5. The reverse current inhibitor according to claim 1, wherein the output current is passed through a shunt resistor and a voltage drop across the shunt resistor serves as a control voltage for the second switching device.

6. The reverse current inhibitor according to claim 5, wherein the second switching device comprises a transistor configured to control a current through a voltage divider, and wherein the voltage divider serves as the first switching device.

7. The reverse current inhibitor according to claim 1, wherein the current-voltage converter is configured to amplify the voltage drop only if a current through the sensing resistor is in the forward direction.

8. The reverse current inhibitor according to claim 1, wherein the sensing resistor has a resistance value of 1 ohm or less.

9. The reverse current inhibitor according to claim 8, wherein an ohmic resistance of a stretch of a line that supplies the forward current to an electrical load serves as the sensing resistor.

10. A power supply circuit, comprising:
a first power supply and a second power supply configured to supply power into a bus to power one or more electrical loads,
wherein the first power supply and the second power supply are separated from one another on the bus by the reverse current inhibitor according to claim 1.

11. The power supply circuit according to claim 10, further comprising a voltage regulator configured to power amplification in the current-voltage converter,
wherein the voltage regulator is powered by the first power supply.

12. An electrical device for use in areas with a potentially explosive atmosphere, the device comprising:
internal circuitry;
at least one interconnection port configured to connect to outside voltages and/or currents; and
the reverse current inhibitor according to claim 1 wired into a current path between the internal circuitry and the interconnection port.

13. The reverse current inhibitor according to claim 3, wherein the ratio is 1/500 or less.

14. The reverse current inhibitor according to claim 13, wherein the ratio is 1/1000 or less.

15. The reverse current inhibitor according to claim 8, wherein the resistance value is 500 milliohms or less.

16. The reverse current inhibitor according to claim 15, wherein the resistance value is 200 milliohms or less.

* * * * *